United States Patent
Tsuruoka

(10) Patent No.: US 8,917,678 B2
(45) Date of Patent: Dec. 23, 2014

(54) WIRELESS TERMINAL

(75) Inventor: Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 205 days.

(21) Appl. No.: 13/206,928

(22) Filed: Aug. 10, 2011

(65) Prior Publication Data

US 2012/0039274 A1 Feb. 16, 2012

(30) Foreign Application Priority Data

Aug. 12, 2010 (JP) ................ 2010-181117

(51) Int. Cl.
*H04W 4/00* (2009.01)
*H04L 5/00* (2006.01)
*H04W 74/08* (2009.01)

(52) U.S. Cl.
CPC ........... *H04L 5/0005* (2013.01); *H04L 5/0058* (2013.01); *H04L 5/0091* (2013.01); *H04W 74/08* (2013.01)
USPC ........................... 370/329; 455/450; 375/260

(58) Field of Classification Search
USPC .................... 370/329, 334; 455/450; 375/260
See application file for complete search history.

(56) References Cited

U.S. PATENT DOCUMENTS

| | | | | |
|---|---|---|---|---|
| 7,136,654 B1* | 11/2006 | Hogberg et al. | ............... | 455/450 |
| 8,320,315 B2* | 11/2012 | Aramoto | ........................ | 370/329 |
| 8,559,938 B2* | 10/2013 | Sato et al. | .................. | 455/422.1 |
| 2006/0072522 A1* | 4/2006 | Chandra et al. | ............... | 370/338 |
| 2007/0183321 A1* | 8/2007 | Takeda et al. | ................. | 370/229 |
| 2009/0075664 A1* | 3/2009 | Palanki et al. | ................ | 455/446 |
| 2010/0040011 A1* | 2/2010 | Kang et al. | ..................... | 370/329 |
| 2010/0067467 A1* | 3/2010 | Cho et al. | ....................... | 370/329 |
| 2010/0195579 A1* | 8/2010 | Park et al. | ...................... | 370/329 |
| 2010/0208837 A1* | 8/2010 | Vetter et al. | .................... | 375/267 |
| 2010/0265907 A1* | 10/2010 | Meier | ............................ | 370/329 |
| 2011/0007830 A1* | 1/2011 | Tanaka | .......................... | 375/260 |
| 2012/0170521 A1* | 7/2012 | Vogedes et al. | ............... | 370/329 |
| 2012/0287879 A1* | 11/2012 | Nentwig | ....................... | 370/329 |

FOREIGN PATENT DOCUMENTS

JP 2007-68092 A 3/2007

OTHER PUBLICATIONS

Capacity Enhancement of a Multi-User OFDM System Using Dynamic Frequency Allocation—Teo Choon Heng Alen, A. S. Madhukumar, and Francois Chin, IEEE Transactions on Broadcasting, vol. 49, No. 4, Dec. 2003.*

(Continued)

*Primary Examiner* — Hassan Kizou
*Assistant Examiner* — Deepa Belur
(74) *Attorney, Agent, or Firm* — Fujitsu Patent Center

(57) ABSTRACT

A wireless terminal for transmitting data to a base station with placing the data on a plurality of subcarriers, the wireless terminal includes: an antenna; and a processor configured for controlling the antenna to transmit, to the base station, a request signal for requesting an access right with placing the request signal on a predetermined number of subcarriers; and controlling the antenna to transmit, to the base station, a request message for requesting a communication resource being transmitted by subcarriers whose number is less than the predetermined number, to use the access right assigned by the base station with respect to the request signal when the wireless terminal has transmission data; wherein the processor is configured to control the antenna to transmit the request message to the base station when the level of communication with the base station is lower than a threshold value.

18 Claims, 12 Drawing Sheets

(56) References Cited

OTHER PUBLICATIONS

Multiuser OFDM with Adaptive Subcarrier, Bit, and Power Allocation; IEEE Journal on Selected Areas in Communication, vol. 17, No. 10, Oct. 1999; Cheong Yui Wong, Roger S. Cheng, Member, IEEE, Khaled Ben Letaief, Senior Member, IEEE and Ross D. Murch, Senior Member IEEE.*

* cited by examiner

WIRELESS TERMINAL

CROSS-REFERENCE TO RELATED APPLICATION

This application is based upon and claims the benefit of priority of the prior Japanese Patent Application No. 2010-181117 filed on Aug. 12, 2010, the entire contents of which are incorporated herein by reference.

FIELD

The embodiments discussed herein are related to a wireless terminal that palaces data on a plurality of subcarriers and transmits the data.

BACKGROUND

In wireless mobile communication, when the distance between a base station (BS) and a wireless terminal such as a mobile station (MS) is long, a situation may occur in which a radio wave does not reach the base station from the wireless terminal while a radio wave reaches the wireless terminal from the base station. When such a situation occurs, it is difficult for the wireless terminal to request an access right or a transmission right from the base station.

For example, in WiMAX (IEEE802.16e) in which an Orthogonal Frequency Division Multiple Access (OFDMA) method is adopted, a wireless terminal transmits CDMA ranging used for requesting the assignment of a communication slot to a base station. Namely, when no communication slot is assigned to the wireless terminal, it is necessary for the wireless terminal to transmit CDMA ranging to the base station before transmitting data.

However, the number of subcarriers used for transmitting the CDMA ranging is large. For example, at the case of a 10 MHz bandwidth, 144 subcarriers are used for transmitting the CDMA ranging. On the other hand, in usual data transmission, the wireless terminal can transmit data with placing the data on 24 subcarriers when the number of subcarriers is a minimum value.

Here, in accordance with a standard or the like, a maximum value is set for the electric power of a wireless signal output from the wireless terminal. Therefore, when the number of subcarriers is increased, the amount of maximum power allocatable to each subcarrier is reduced. Namely, the amount of maximum power of each subcarrier used when the CDMA ranging is transmitted is small. Accordingly, even in an environment in which the base station can receive data if the data is transmitted from the wireless terminal to the base station using subcarriers the number of which is small, the CDMA ranging may not reach the base station in some cases. In this case, even though the wireless terminal can transmit and receive data to and from the base station, it is difficult for the wireless terminal to start or maintain communication with the base station. In addition, when data transmission from the wireless terminal is temporarily discontinued, the base station halts the assignment of a communication slot for the wireless terminal. When the data transmission is discontinued, it is necessary for the wireless terminal to transmit the CDMA ranging for data transmission. At this time, if no new CDMA ranging reaches the base station, the communication between the base station and the wireless terminal turns out to be disconnected. When the communication is disconnected, the base station determines the wireless terminal to be "out of service".

The above-mentioned problem does not only relate to WiMAX (IEEE802.16e). Namely, the above-mentioned problem may occur in a wireless communication system in which data transmission is performed with data being placed on a plurality of subcarriers and a base station assigns an access right or a transmission right to a wireless terminal in response to a request from the wireless terminal.

As a related technique, a wireless communication method and a relay station have been proposed that effectively perform the unbiased assignment of a wireless resource for a subscriber station located outside the communication range of a base station. In this method, the relay station receives service request information from the subscriber station, and calculates a first necessary wireless resource necessary for a service indicated by the service request information, on the basis of the situation of communication with the subscriber station. In addition to this, on the basis of the situation of communication with the base station, the relay station calculates a second necessary wireless resource necessary for the service indicated by the service request information, and transmits, to the base station, service request information used for requesting the assignment of a third necessary wireless resource greater than or equal to the sum of the first necessary wireless resource and the second necessary wireless resource. An example of such a method is disclosed in Japanese Laid-open Patent Publication No. 2007-68092.

SUMMARY

According to an aspect of the embodiment, a wireless terminal for transmitting data to a base station with placing the data on a plurality of subcarriers, the wireless terminal includes: an antenna; and a processor configured for controlling the antenna to transmit, to the base station, a request signal for requesting an access right with placing the request signal on a predetermined number of subcarriers; and controlling the antenna to transmit, to the base station, a request message for requesting a communication resource being transmitted by subcarriers whose number is less than the predetermined number, to use the access right assigned by the base station with respect to the request signal when the wireless terminal has transmission data; wherein the processor is configured to control the antenna to transmit the request message to the base station when the level of communication with the base station is lower than a threshold value.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
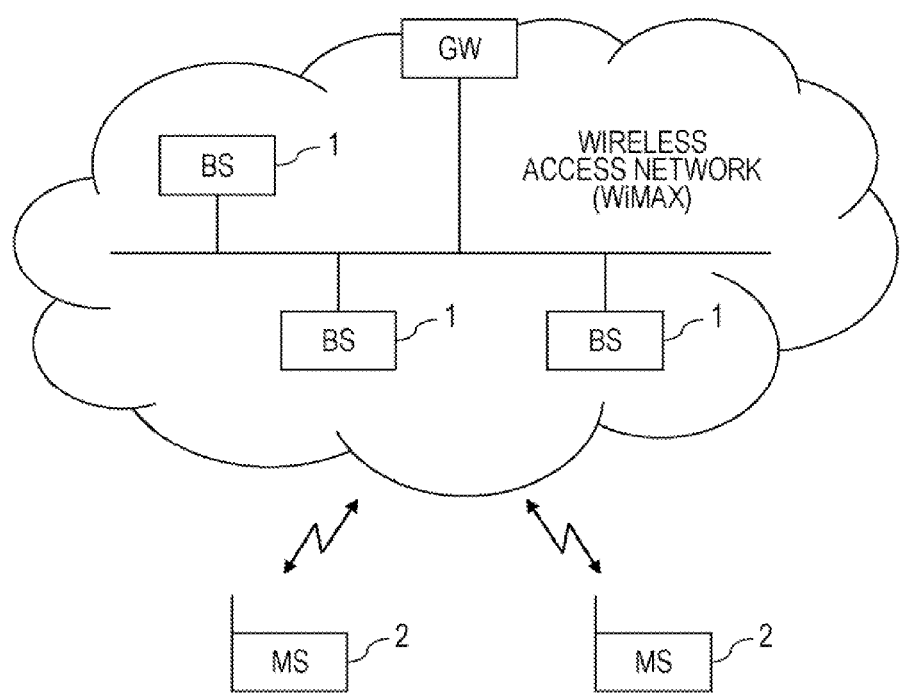
FIG. 1 is a diagram illustrating an example of a wireless communication system in which a wireless terminal according to an embodiment is used.

FIG. 1 is a diagram illustrating an example of a wireless communication system in which a wireless terminal according to an embodiment is used. In an example illustrated in FIG. 1, the wireless communication system is WiMAX (IEEE802.16e) system. In WiMAX, OFDMA is adopted, and data is transmitted with being placed on a plurality of subcarriers whose frequencies are different from one another.

The wireless communication system includes a base station (BS) 1. Namely, the base station 1 builds a wireless access network (namely, a WiMAX network). In the example illustrated in FIG. 1, the wireless communication system includes a plurality of base stations 1. For example, the plural base stations 1 are connected to one another through an optical fiber cable or a metal cable. In addition, the plural base stations 1 are connected to a gateway device. The gateway device connects the wireless access network and an external network.

A wireless terminal (MS) 2 is the wireless terminal according to the embodiment, and is connected to the base station 1. The wireless terminal 2 receives a down-link signal transmitted from the base station 1. A link used for transmitting a signal from the base station 1 to the wireless terminal 2 is called a down link. A link used for transmitting a signal from the wireless terminal 2 to the base station 1 is called an up link. The wireless terminal 2 transmits data to another terminal through the base station 1. For example, the terminal of a transmission destination is another wireless terminal 2 connected to the wireless access network. Alternatively, the terminal of the transmission destination is a terminal connected to the external network.

Figure 2:
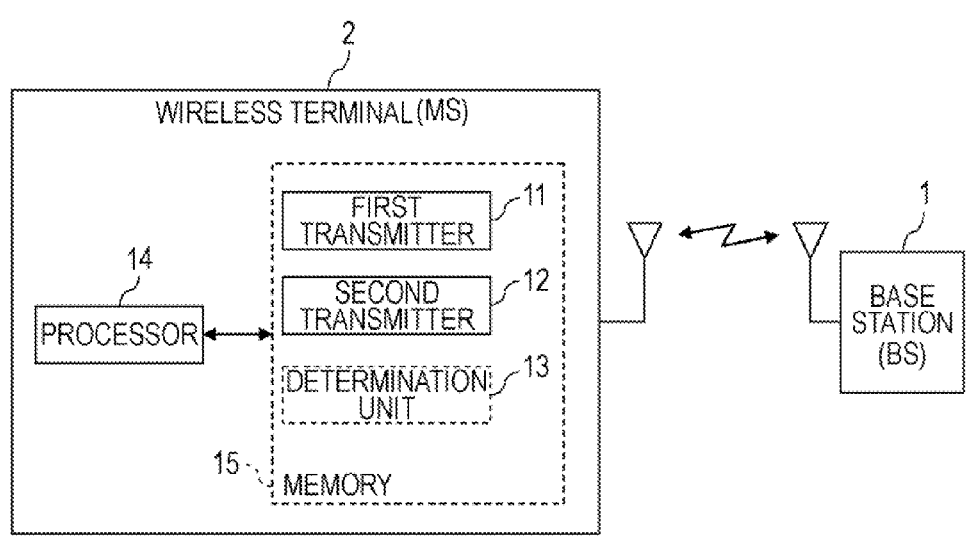
FIG. 2 is a functional block diagram of the wireless terminal.

FIG. 2 is the functional block diagram of the wireless terminal 2. In FIG. 2, a portion of a function relating to an operation for accessing the base station 1 is illustrated. The base station 1 manages the access right of each wireless terminal 2 and the assignment of a communication resource.

The wireless terminal 2 includes a first transmitter 11, a second transmitter 12, and a determination unit 13. The first transmitter 11 transmits, to the base station 1, a request signal for requesting an access right with placing the request signal on a predetermined number of subcarriers. When receiving the request signal from the wireless terminal 2, the base station 1 grants the access right to the wireless terminal 2. When simultaneously receiving the request signals from the plural wireless terminals 2, the base station 1 arbitrates competition between the wireless terminals using a predetermined algorithm.

Using the access right assigned to the request signal by the base station 1, the second transmitter 12 transmits, to the base station 1, a request message for requesting a communication resource. The second transmitter 12 can transmit the request message, using subcarriers whose number is less than the number of subcarriers used when the transmitter 11 transmits the request signal. For example, the request message is a signal used for requesting a bandwidth corresponding to the size of transmission data. When receiving the request message from the wireless terminal 2, the base station 1 determines whether or not the requested communication resource can be assigned. In addition, when the requested communication resource can be assigned, the base station 1 notifies the wireless terminal 2 of the communication resource (for example, a communication slot) assigned to the wireless terminal 2. Using the communication resource given notice of, the wireless terminal 2 transmits data.

In this regard, however, depending on the position of the wireless terminal 2, a communication level between the base station 1 and the wireless terminal 2 is lowered. For example, when the wireless terminal 2 is located in an area near the cell edge of the base station 1, the base station 1 may not receive a signal transmitted from the wireless terminal 2, in some cases. If the signal transmitted from the wireless terminal 2 does not reach the base station 1, it is impossible for the wireless terminal 2 to receive the access right.

Therefore, when the level of communication with the base station 1 is lower than a threshold value, the second transmitter 12 in the wireless terminal 2 transmits, to the base station 1, a request message for requesting a communication resource even if the wireless terminal 2 does not have transmission data. While the threshold value is not limited to a specific example, the threshold value is a value used for determining whether or not the request signal transmitted from the wireless terminal 2 with maximum transmission power can be received by the base station 1, for example. When the level of communication with the base station 1 is lower than the threshold value, it may be determined that the base station 1 is in a state in which it is difficult for the base station 1 to receive the request signal. In addition, it is assumed that the maximum transmission power Pmax of the wireless terminal 2 is determined on the basis of a standard or the like. In addition, the wireless terminal 2 may include a determination unit 13 that determines whether or not the communication level between the base station 1 and the wireless terminal 2 is lower than the threshold value.

As described above, the number of subcarriers used for transmitting the request message is less than the number of subcarriers used for transmitting the request signal. Therefore, if it is assumed that the transmission power of the wireless terminal 2 is the same, the request message easily reach the base station 1, compared with the request signal. For example, it is assumed that the request signal is transmitted with being placed on 144 subcarriers and the request message is transmitted with being placed on 24 subcarriers. In this case, the electric power of each subcarrier used for transmitting the request signal is up to "Pmax/144". On the other hand, the electric power of each subcarrier used for transmitting the request message is up to "Pmax/24". Namely, depending on the position (for example, an area near the cell edge of the base station 1) of the wireless terminal 2, the request message reaches the base station 1 while the request signal does not reach the base station 1.

In this way, when the level of communication with the base station 1 is lower than the threshold value, the wireless terminal 2 transmits the request message to the base station 1 even if the wireless terminal 2 has no data to be transmitted to the base station 1. For example, the second transmitter periodically repeatedly transmits the request message to the base station 1. In addition, every time receiving the request message, the base station 1 assigns a communication resource to the wireless terminal 2. Accordingly, when the level of communication with the base station 1 is lower than the threshold value, the wireless terminal 2 can maintain communication with the base station 1 regardless of whether or not there is transmission data. As a result, the wireless terminal 2 lowers a risk that the wireless terminal 2 is determined to be "out of service" at the start of communication or the like.

The transmission signal or the transmit request, generated in the first transmitter 11 or the second transmitter 12, is multiplexed into a transmission frame structure defined by a wireless protocol, also used for other control information and user data use, and transmitted.

For example, the first transmitter 11, the second transmitter 12, and the determination unit 13 are realized by executing a program providing the above-mentioned procedures. In this case, the wireless terminal 2 includes a processor 14 that executes the program corresponding to the first transmitter 11, the second transmitter 12, and the determination unit 13. In addition, the program corresponding to the first transmitter 11, the second transmitter 12, and the determination unit 13 is stored in a memory 15. The memory 15 stores therein data to be transmitted to the base station 1 and stores therein data received from the base station 1.

The first transmitter 11, the second transmitter 12, and the determination unit 13 may not necessarily be realized using the program. Namely, the first transmitter 11, the second transmitter 12, and the determination unit 13 may be realized using a hardware circuit providing the above-mentioned procedures. In addition, the first transmitter 11, the second transmitter 12, and the determination unit 13 may be realized using a combination of a hardware circuit and software.

Figure 3:
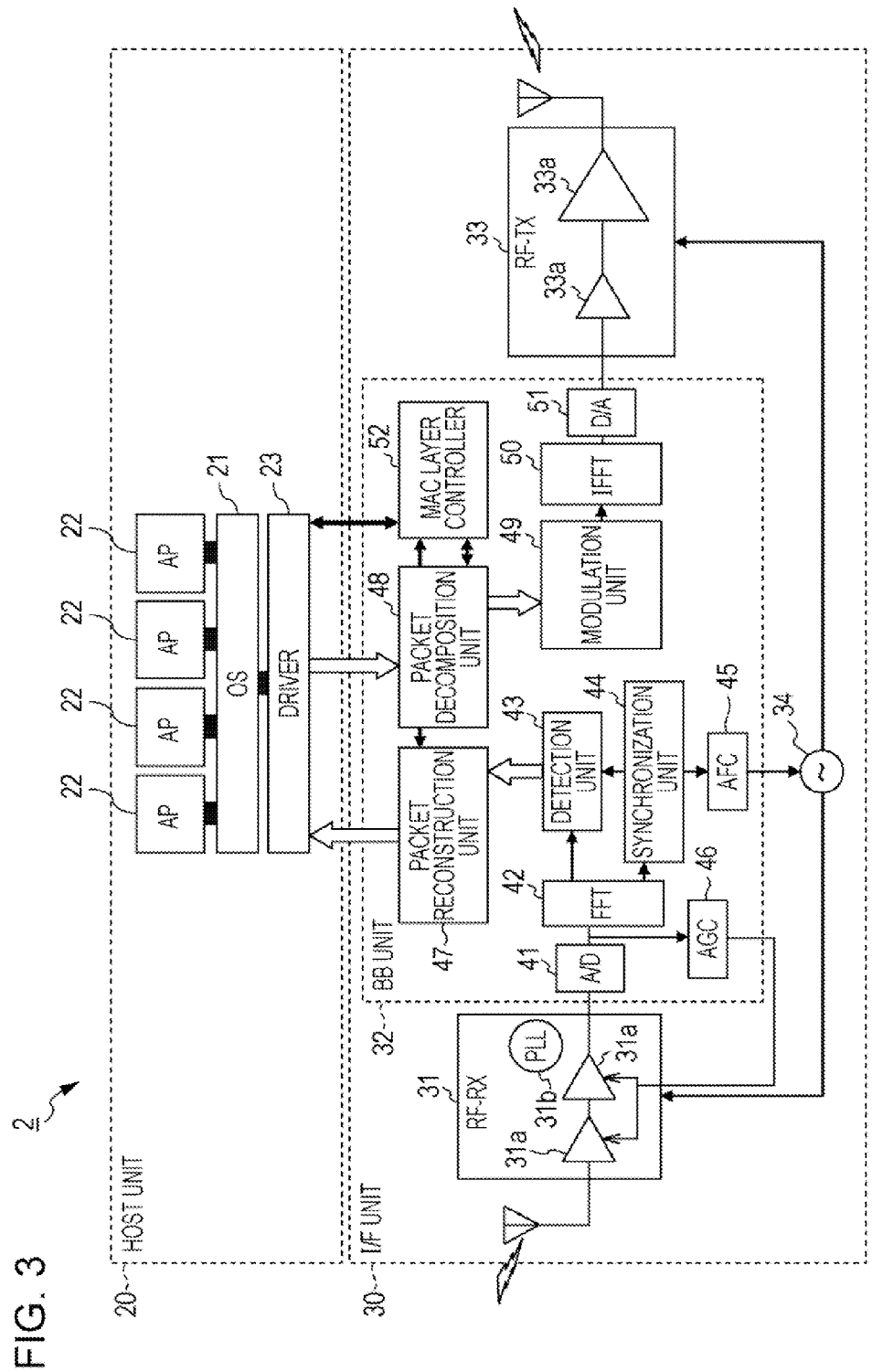
FIG. 3 is a diagram illustrating a configuration of the wireless terminal.

FIG. 3 is a diagram illustrating the configuration of the wireless terminal 2. In the embodiment, the wireless terminal 2 includes a host unit 20 and an I/F unit 30. The host unit 20 includes an operating system (OS) 21, an application (AP) 22, and a driver 23. The operating system 21 provides an interface, into which hardware is abstracted, to the application 22. Namely, each application 22 operates on the operating system 21. The application 22 is a program including a function that a user of the wireless terminal 2 desires to implement using the wireless terminal 2. For example, the application 22 generates transmission data in response to an instruction from the user. In addition, for example, the application 22 provides, to the user, reception data from another terminal. The driver 23 is disposed between the operating system 21 and a peripheral device, and manages the operation of the peripheral device. In addition, in the example, the peripheral device is the I/F unit 30.

The I/F unit 30 includes an RF-RX unit 31, a baseband unit (BB) 32, and an RF-TX unit 33. The RF-RX unit 31 includes a reception amplifier 31a and a PLL circuit 31b. The RF-RX unit 31 regenerates a baseband signal from a reception radio wave. At this time, the gain of the reception amplifier 31a is controlled by an AGC unit 46 included in the baseband unit 32. In addition, the PLL circuit 31b establishes synchronization on the basis of a clock output from an oscillator 34. The RF-TX unit 33 includes a transmission amplifier 33a. The RF-TX unit 33 outputs a transmission signal generated by the baseband unit 32, through an antenna.

The baseband unit 32 regenerates data from a reception signal, and transfers the data to the host unit 20. Namely, an A/D converter 41 converts the output signal of the RF-RX unit 31 into a digital signal. An FFT unit 42 converts the digital signal into a frequency-domain signal. The frequency-domain signal represents a signal transmitted using each subcarrier. On the basis of a synchronization signal obtained by the synchronization unit 44, a detection unit 43 regenerates a data sequence from the signal of each subcarrier, and sends the data sequence to a packet reconstruction unit 47. In addition, the packet reconstruction unit 47 reconstructs a packet from the regenerated data sequence, and transmits the packet to the host unit 20. Accordingly, the host unit 20 receives data transmitted from another terminal.

The synchronization unit 44 detects synchronization from the frequency-domain signal output from the FFT unit 42, and outputs a synchronization signal. An AFC unit 45 generates an AFC signal used for controlling the frequency of the oscillator 34, on the basis of the synchronization signal. Accordingly, the frequency of the oscillator 34 is controlled so as to be an optimum value. In addition, the AGC unit 46 generates an AGC signal used for controlling the amplitude of the digital signal output from the A/D converter 41 so that the amplitude of the digital signal is a value within a predetermined range. Namely, the AGC unit 46 controls the gain of the reception amplifier 31a included in the RF-RX unit 31.

In addition, the baseband unit 32 generates a transmission signal from data generated by the host unit 20, and transfers the transmission signal to the RF-TX unit 33. Namely, a packet decomposition unit 48 decomposes a packet storing therein transmission data, and generates a data sequence. In response to the data sequence obtained by the packet decomposition unit 48, a modulation unit 49 generates a modulation signal using a modulation method specified by a MAC layer controller 52. An IFFT unit 50 converts the modulation signal into a time-domain signal. The transmission signal or the message of the first transmitter 11 or the second transmitter 12 in FIG. 2 is multiplexed as a time-domain signal at this stage. A D/A converter 51 converts the time-domain signal into an analog signal. In addition, the RF-TX unit 33 amplifies and transmits the output signal of the baseband unit 32.

The MAC layer controller 52 executes signal processing for a MAC layer. At this time, the MAC layer controller 52 controls the transmission and reception of data performed between the host unit 20 and the I/F unit 30. In addition, the MAC layer controller 52 controls the packet reconstruction unit 47 and the packet decomposition unit 48. Furthermore, the MAC layer controller 52 transmits and receives a control signal and a control message to and from the base station 1, in a sequence described later. Furthermore, for example, processing operation performed in the first transmitter 11, the second transmitter 12, and the determination unit 13 in FIG. 2 may be executed by the MAC layer controller 52.

In addition, while being not limited to a specific example, the I/F unit 30 may also be realized as a wireless interface module embedded in the wireless terminal 2. Alternatively, the baseband unit 32 may also be realized as a wireless interface module.

Figure 4:
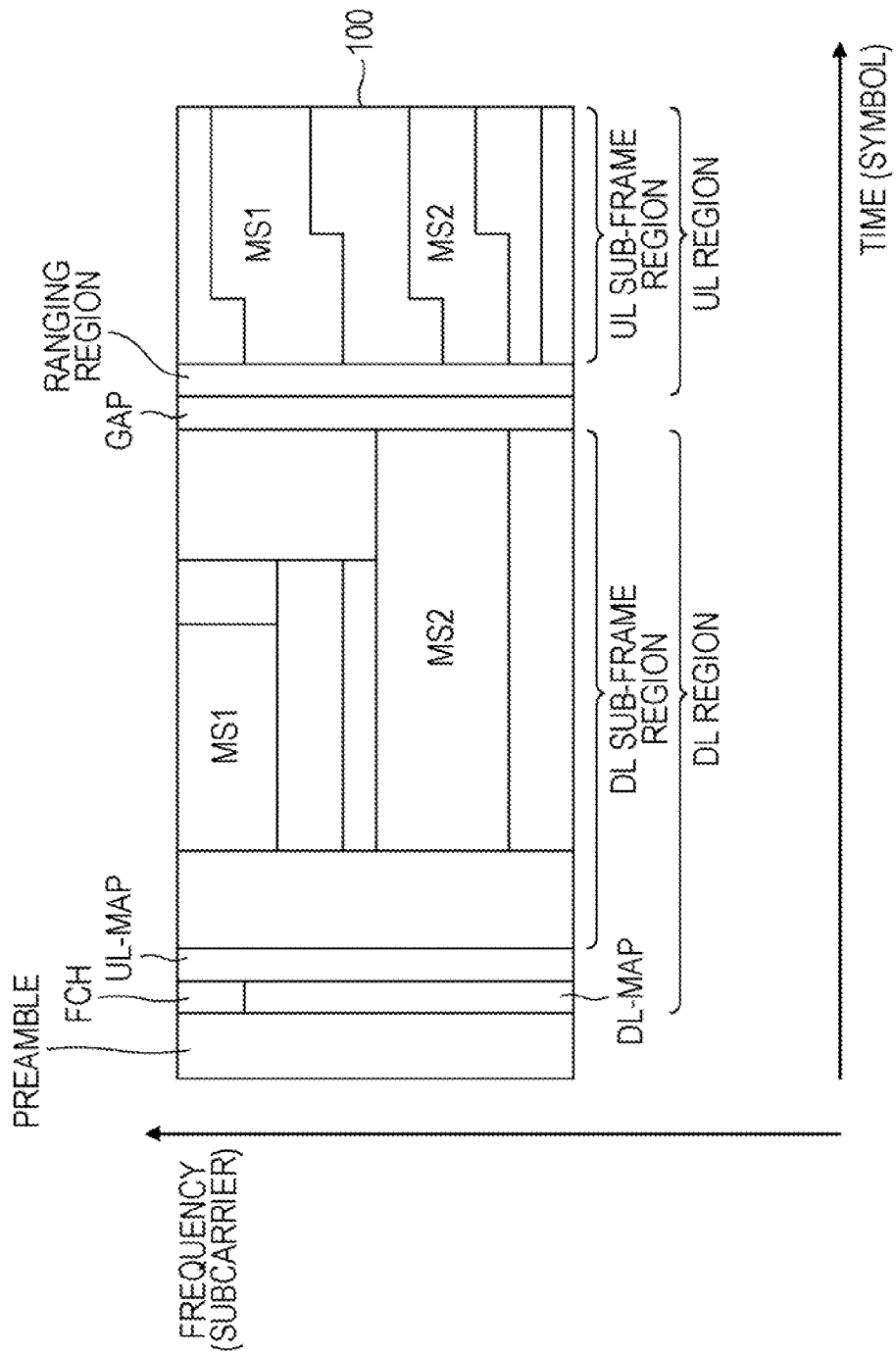
FIG. 4 is a diagram schematically illustrating a frame used between a base station and the wireless terminal.

FIG. 4 is a diagram schematically illustrating a frame used between the base station 1 and the wireless terminal 2. In the example, the wireless communication system is a WiMAX system. Namely, FIG. 4 schematically illustrates an OFDM frame used in WiMAX.

A frame 100 in FIG. 4 is represented by a time axis and a frequency axis. In a time axis direction, symbols are placed at predetermined intervals (namely, symbol intervals). In addition, in a frequency axis direction, subcarriers are placed.

The frame 100 includes a preamble, a down link (DL) region, and an up link (UL) region. The preamble is a signal having a predetermined pattern, and is used for establishing synchronization between the base station 1 and the wireless terminal 2 in the initial stage of communication. In addition, the preamble may also be used for monitoring the quality of the frame 100 transmitted from the base station 1.

The DL region includes a frame control header (FCH), a down link mapping information (Down Link Mapping message: DL-MAP), an up link mapping information (Up Link Mapping message: UL-MAP), and a DL sub-frame region. The FCH is notification information including information used by the wireless terminal 2 for receiving the DL-MAP and the UL-MAP (for example, information indicating the modulation methods, the coding methods, or the like of the DL-MAP and the UL-MAP).

The DL-MAP is control information indicating a communication resource, a communication method, and the like used for transmitting down-link data. Here, the DL-MAP includes information indicating the "position" of each data placed in the DL sub-frame region. For example, when the down-link data is stored, as a "burst", within the DL sub-frame region, the DL-MAP includes control information indicating the characteristic of the burst. For example, the characteristic of each burst is represented by the size, the position, the modulation method, and the coding method of each burst, a gain specifying the transmission power of each burst, and the like. In addition, for example, the control information indicating the characteristic of the burst is burst profile information such as a downlink interval usage code (DIUC) or the like.

In the same way, the UL-MAP is control information indicating a communication resource, a communication method, and the like used for transmitting up-link data. In addition, the UL-MAP includes control information indicating the characteristic of a burst corresponding to the up-link data. In this regard, however, for example, the control information within the UL-MAP includes burst profile information such as an uplink interval usage code (UIUC) or the like.

In addition, in FIG. 4, the "position" of the burst indicates a time zone during which a plurality of subcarriers used for transmitting data and the data are transmitted. Namely, the "position" specifies a communication slot used for transmitting data.

In the DL sub-frame region, data to be transmitted from the base station 1 to a desired wireless terminal 2 through a down link is placed. In the example illustrated in FIG. 4, down-link data to be transmitted from the base station 1 to wireless terminals MS1 and MS2 is placed. In addition, data to be transmitted to each wireless terminal 2 is individually stored, as a "burst", in the DL sub-frame region. The size, the position, the modulation method, and the coding method of each burst, a gain specifying the transmission power of each burst, and the like are specified by the DL-MAP, in such a way as described above.

The UL region includes a ranging region and an UL sub-frame region. In addition, a GAP corresponding to a predetermined time is provided between the DL region and the UL region.

The ranging region is used for transmitting a ranging signal from the wireless terminal 2 to the base station 1. Examples of the ranging signal transmitted from the wireless terminal 2 to the base station 1 include an initial ranging signal (Initial Ranging), a bandwidth ranging signal (BW ranging), and the like. In addition, in the UL sub-frame region, data to be transmitted from the wireless terminal 2 to the base station 1 through an up link is placed. In the example illustrated in FIG. 4, up-link data to be transmitted from the wireless terminals MS1 and MS2 to the base station 1 is placed in the UL sub-frame region. The size, the position, the modulation method, and the coding method of each burst, a gain specifying the transmission power of each burst, and the like, stored in the UL sub-frame region, are specified by the UL-MAP.

Figure 5:
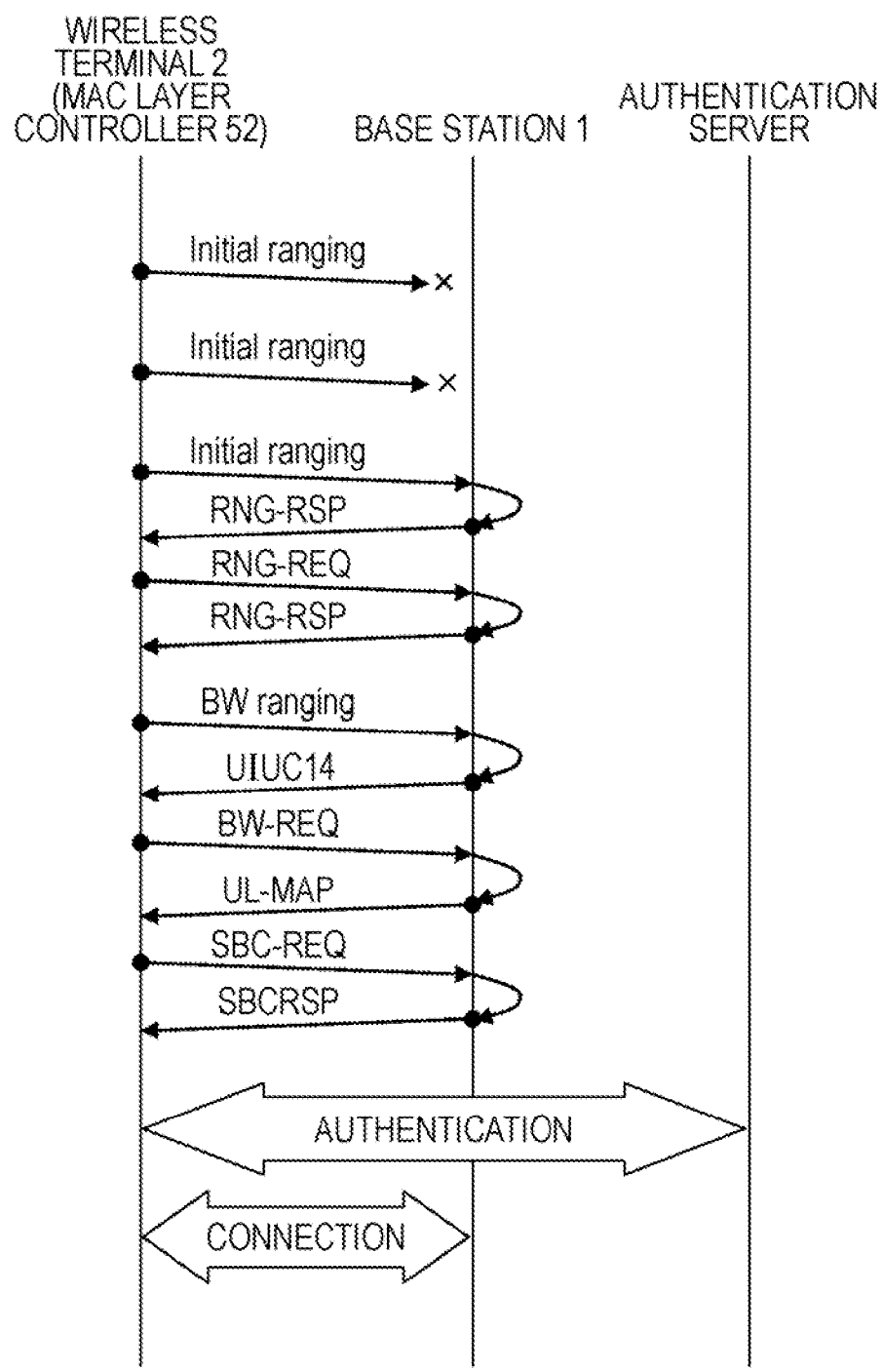
FIG. 5 is a diagram illustrating an initial connection sequence between the base station and the wireless terminal.

FIG. 5 is a diagram illustrating an initial connection sequence between the base station 1 and the wireless terminal 2. In addition, in the wireless terminal 2, processing relating to the sequence is executed by the MAC layer controller 52.

At the start of communication, the wireless terminal 2 transmits the initial ranging signal (Initial Ranging) to the base station 1. At this time, until receiving a response corresponding to the initial ranging signal from the base station 1, the wireless terminal 2 repeatedly transmits the initial ranging signal. When receiving the initial ranging signal from the wireless terminal 2, the base station 1 sends back a corresponding response (RNG_RES).

When receiving a response corresponding to the initial ranging signal from the base station 1, the wireless terminal 2 transmits a ranging request (RNG_REQ) to the base station 1. In addition, when receiving the ranging request from the wireless terminal 2, the base station 1 sends back a corresponding response (RNG_RES).

When receiving a response corresponding to the ranging request from the base station 1, the wireless terminal 2 transmits a bandwidth ranging signal (BW ranging) to the base station 1. At this time, the wireless terminal 2 transmits the bandwidth ranging signal (BW ranging) using the ranging region of the frame 100 illustrated in FIG. 4. For example, in a system whose bandwidth is 10 MHz, the bandwidth ranging signal (BW ranging) is transmitted to the base station 1 with being placed on 144 subcarriers. In addition, the bandwidth ranging signal (BW ranging) corresponds to the request signal transmitted by the first transmitter 11 illustrated in FIG. 2.

When receiving the bandwidth ranging signal (BW ranging) from the wireless terminal 2, the base station 1 sends back an uplink interval usage code (UIUC). The UIUC includes information for specifying a communication slot. In the example, the base station 1 sends back a UIUC 14 to the wireless terminal 2.

Using a communication slot corresponding to the value of the received UIUC, the wireless terminal 2 transmits a bandwidth request message (BW_REQ) to the base station 1. At this time, since the bandwidth request message (BW_REQ) is transmitted using a communication slot assigned by the UIUC 14, the bandwidth request message (BW_REQ) is transmitted using subcarriers whose number is less than that for the bandwidth ranging signal (BW ranging). For example, when a bandwidth is 10 MHz, the wireless terminal 2 transmits the bandwidth request message (BW_REQ) to the base station 1 using subcarriers whose number is less than 144. As one embodiment, the bandwidth request message (BW_REQ) is transmitted from the wireless terminal 2 to the base station 1 using 24 subcarriers.

In addition, the bandwidth request message (BW_REQ) requests a bandwidth corresponding to the information amount of data the wireless terminal 2 transmits. In addition, the bandwidth request message (BW_REQ) corresponds to the request message transmitted by the second transmitter 12 illustrated in FIG. 2.

When the base station 1 can provide the bandwidth requested by the bandwidth request message (BW_REQ), the base station 1 sends back the UL-MAP to the wireless terminal 2. As described above, the UL-MAP includes the control information used for transmitting data from the wireless terminal 2 to the base station 1. Accordingly, on the basis of the UL-MAP, the wireless terminal 2 recognizes a communication slot, a communication method, and the like used for transmitting data to the base station 1.

Furthermore, the wireless terminal 2 transmits SBC-REQ to the base station 1. In addition, when receiving the SBC-REQ, the base station 1 sends back SBC-RES to the wireless terminal 2. After that, the wireless terminal 2 accesses an authentication server. In addition, when authentication succeeds, the wireless terminal 2 is connected to the base station 1.

Figure 6:
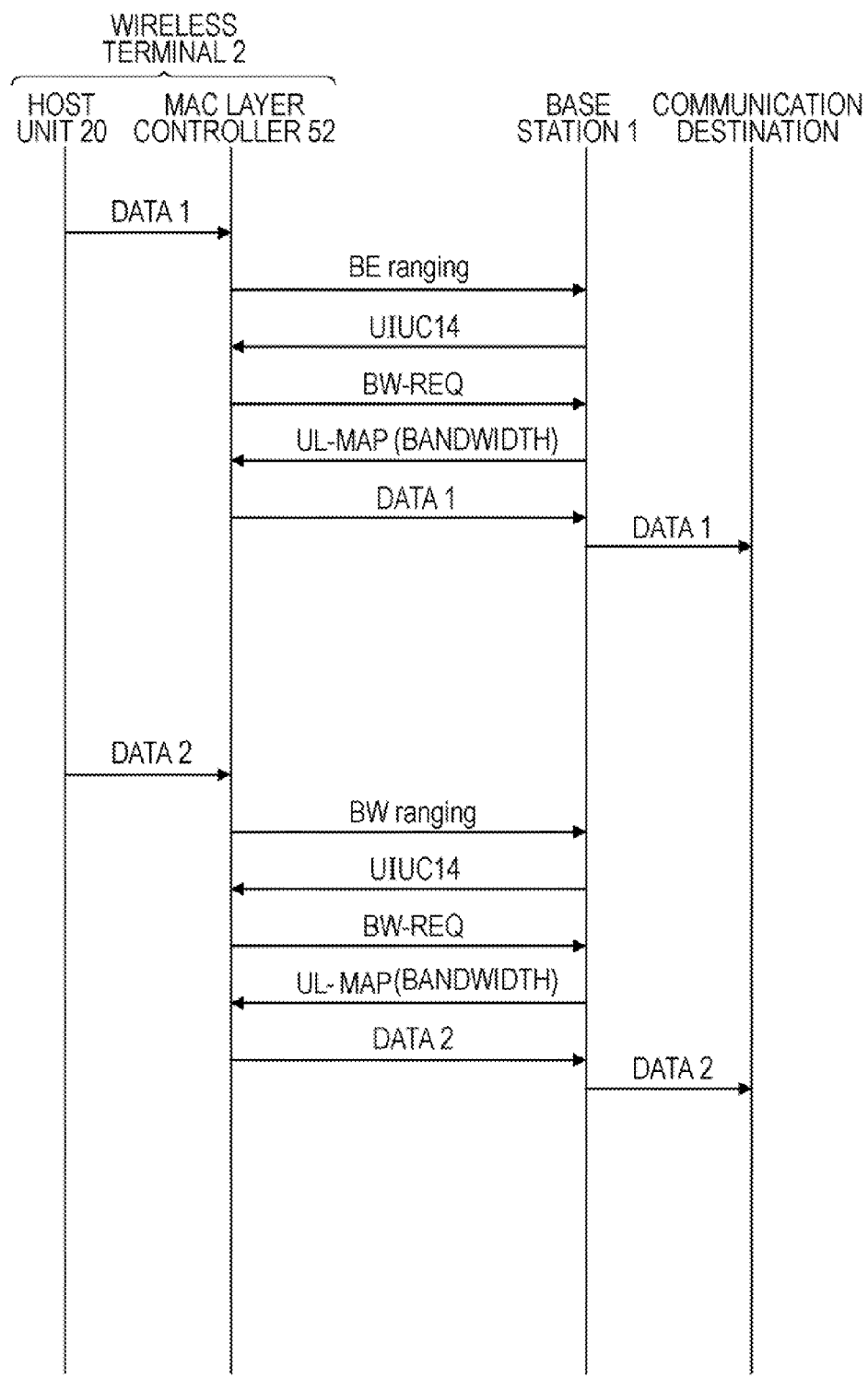
FIG. 6 is a diagram illustrating a data transmission sequence of the wireless terminal.

FIG. 6 is a diagram illustrating the data transmission sequence of the wireless terminal 2. In addition, FIG. 6 illustrates the data communication sequence when the communication level between the base station 1 and the wireless terminal 2 is greater than or equal to the threshold value. In the example, the phrase "the communication level is greater than or equal to the threshold value" means a state in which the bandwidth ranging signal (BW ranging) transmitted from the wireless terminal 2 can be received by the base station 1. In addition, it is assumed that the sequence illustrated in FIG. 6 is executed after the wireless terminal 2 is connected to the base station 1 on the basis of the initial connection sequence illustrated in FIG. 5. Furthermore, in the example, an application included in the host unit 20 generates and transmits data 1 and data 2 to another terminal that is a communication destination.

The host unit 20 generates and transmits the data 1 to the I/F unit 30. In addition, the MAC layer controller 52 detects the generation of the data 1. After doing so, the MAC layer controller 52 creates and transmits the bandwidth ranging signal (BW ranging) to the base station 1. As described above, the bandwidth ranging signal (BW ranging) is transmitted using the ranging region illustrated in FIG. 4. In addition, when receiving the bandwidth ranging signal (BW ranging), the base station 1 sends back the UIUC 14 to the wireless terminal 2.

When receiving the UIUC 14, the wireless terminal 2 transmits, to the base station 1, the bandwidth request message (BW_REQ) for requesting a communication resource necessary for transmitting the data 1. At this time, the bandwidth request message (BW_REQ) is transmitted using a communication slot specified by the UIUC 14. In addition, when receiving the bandwidth request message (BW_REQ), the base station 1 sends back the UL-MAP to the wireless terminal 2. The UL-MAP includes control information used for transmitting the data 1 from the wireless terminal 2 to the base station 1.

When receiving the UL-MAP, the wireless terminal 2 transmits the data 1 to the base station 1 on the basis of the control information included in the UL-MAP. In addition, the base station 1 transfers the data 1 transmitted from the wireless terminal 2 to the terminal of a communication destination. Accordingly, the terminal of a communication destination receives the data 1 transmitted from the wireless terminal 2.

Subsequently, the wireless terminal 2 transmits the data 2. In this regard, however, in the example illustrated in FIG. 6, it is assumed that the host unit 20 generates the data 2 after the transmission of the data 1 by the MAC layer controller 52 is finished. In this case, the wireless terminal 2 transmits the bandwidth ranging signal (BW ranging) to the base station 1 again.

In response to this, in the same way as the procedure for transmitting the data 1, the wireless terminal 2 and the base station 1 transmit and receive the UIUC 14, the bandwidth request message (BW_REQ), and the UL-MAP. In addition, the wireless terminal 2 transmits the data 2 to the base station 1 in accordance with the received UL-MAP. Accordingly, the terminal of a communication destination receives the data 2 transmitted from the wireless terminal 2.

In this way, when the host unit 20 generates transmission data, the wireless terminal 2 transmits the bandwidth ranging signal (BW ranging) and the bandwidth request message (BW_REQ) to the base station 1. In addition, the wireless terminal 2 transmits data in accordance with the UL-MAP corresponding to the bandwidth request message (BW_REQ).

Figure 7:
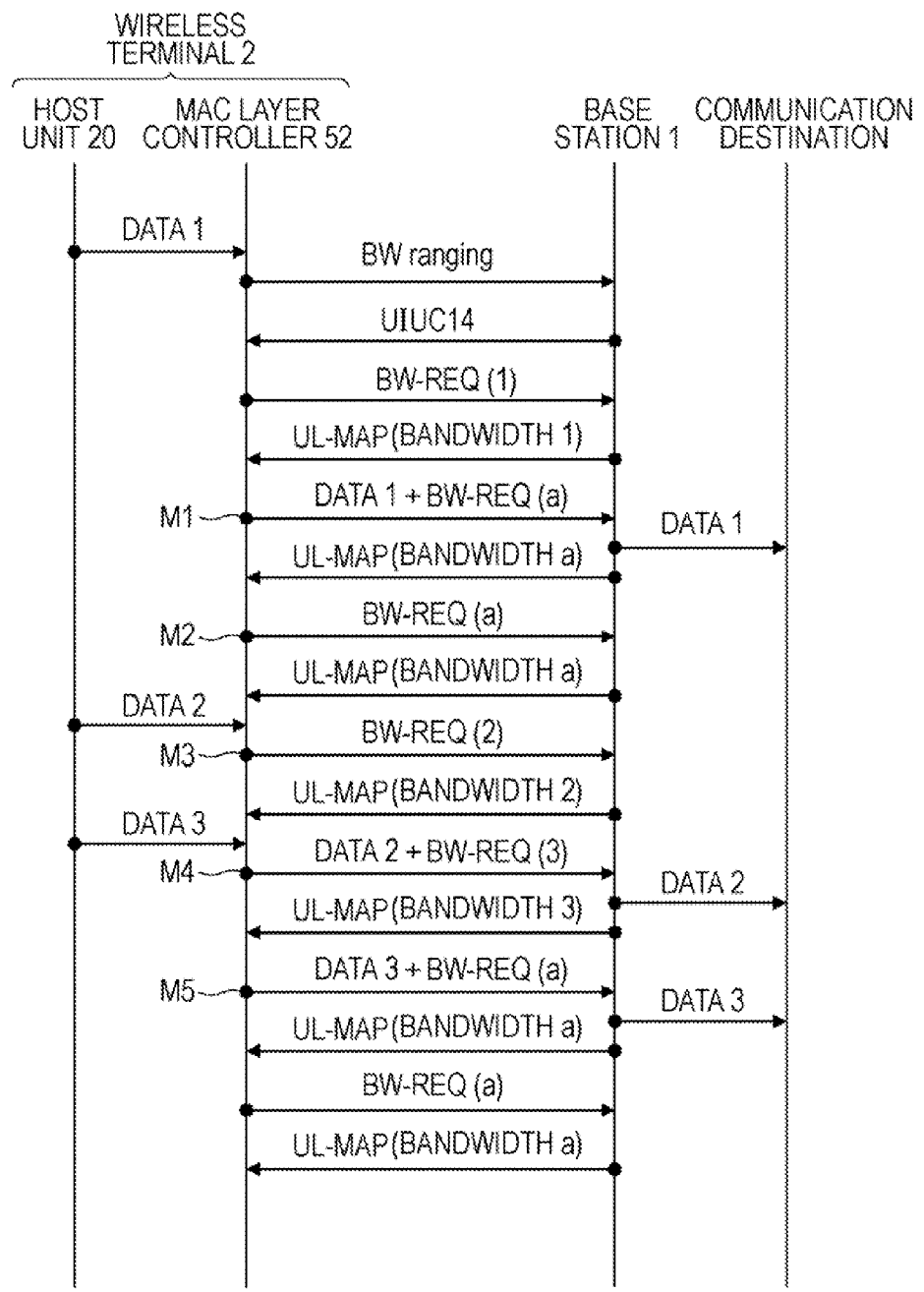
FIG. 7 is a diagram illustrating a data transmission sequence of the wireless terminal when a communication environment is deteriorated.

FIG. 7 is a diagram illustrating the data transmission sequence of the wireless terminal 2 when a communication environment is deteriorated. In the example, it is assumed that the wireless terminal 2 transmits data 1 to data 3 to the terminal of a communication destination. In addition, it is assumed that the wireless terminal 2 includes a function for estimating the environment of communication with the base station 1.

When the host unit 20 generates the data 1, the MAC layer controller 52 transmits the bandwidth ranging signal (BW ranging) to the base station 1. In response to this, as described with reference to FIG. 6, the wireless terminal 2 and the base station 1 transmit and receive the UIUC 14, the bandwidth request message (BW_REQ), and the UL-MAP. In addition, in FIG. 7, "BW-REQ(1)" is the bandwidth request message (BW_REQ) for requesting a communication resource used for transmitting the data 1. "UL-MAP (bandwidth 1)" is up link mapping information that includes control information corresponding to the BW-REQ(1).

As described above, the wireless terminal 2 periodically or continuously monitors the environment of communication with the base station 1. In addition, in the example, it is assumed that, at the time of the execution of a procedure M1 illustrated in FIG. 7, the wireless terminal 2 detects that the communication level between the base station 1 and the wireless terminal 2 is lower than the threshold value. In addition, it is assumed that, at the time of the execution of the procedure M1, no transmission data to which no communication resource is assigned exists in the wireless terminal 2. In addition, at the time of the execution of the procedure M1, a communication resource is assigned to the data 1 by the UL-MAP (bandwidth 1).

In this case, in the procedure M1, the wireless terminal 2 transmits, to the base station 1, BW-REQ(a) in addition to the data 1. The "BW-REQ(a)" is a bandwidth request message (BW_REQ) for requesting a communication resource used for transmitting the bandwidth request message (BW_REQ).

In the example illustrated in FIG. 7, for ease of explanation, it is assumed that the wireless terminal 2 can transmit the "data 1 and BW-REQ(a)" to the base station 1, using the communication resource assigned by the UL-MAP (bandwidth 1). In addition, usually, the information amount of the bandwidth request message (BW_REQ) (here, the BW-REQ (a)) is sufficiently small compared with transmission data (here, the data 1).

When receiving the data 1 and the BW-REQ(a), the base station 1 transfers the data 1 to the terminal of a communication destination. In addition, the base station 1 sends back a UL-MAP (bandwidth a) to the wireless terminal 2. Here, the "UL-MAP (bandwidth a)" includes control information used for transmitting the bandwidth request message (BW_REQ).

Subsequently, in a procedure M2, the wireless terminal 2 transmits the BW-REQ(a) to the base station 1 in accordance with the UL-MAP (bandwidth a). In response to this, the base station 1 sends back the UL-MAP (bandwidth a) to the wireless terminal 2.

After that, the host unit 20 generates the data 2. After doing so, in a procedure M3, the wireless terminal 2 transmits a BW-REQ(2) to the base station 1. The BW-REQ(2) requests a communication resource used for transmitting the data 2. In addition, the base station 1 sends back a UL-MAP (bandwidth 2) to the wireless terminal 2. The UL-MAP (bandwidth 2) includes control information used for transmitting the data 2 from the wireless terminal 2 to the base station 1.

Furthermore, before the wireless terminal 2 transmits the data 2 to the base station 1, the host unit 20 generates the data 3. In this case, in a procedure M4, the wireless terminal 2 transmits, to the base station 1, a BW-REQ(3) in addition to the data 2. The BW-REQ(3) requests a communication resource used for transmitting the data 3.

When receiving the data 2 and the BW-REQ(3), the base station 1 transfers the data 2 to the terminal of a communication destination. Accordingly, the terminal of a communication destination receives the data 2 transmitted from the wireless terminal 2. In addition, the base station 1 sends back a UL-MAP (bandwidth 3) to the wireless terminal 2. The UL-MAP (bandwidth 3) includes control information used for transmitting the data 3 from the wireless terminal 2 to the base station 1.

Furthermore, in a procedure M5, the wireless terminal 2 transmits the data 3 to the base station 1 in accordance with the UL-MAP (bandwidth 3). At this time, the wireless terminal 2 has no transmission data to which no communication resource is assigned. Accordingly, the wireless terminal 2 transmits, to the base station 1, the BW-REQ(a) in addition to the data 3.

When receiving the data 3 and the BW-REQ(a), the base station 1 transfers the data 3 to the terminal of a communication destination. Accordingly, the terminal of a communication destination receives the data 3 transmitted from the wireless terminal 2. In addition, the base station 1 sends back the UL-MAP (bandwidth a) to the wireless terminal 2. Following this, the wireless terminal 2 transmits and receives the BW-REQ(a) and the UL-MAP (bandwidth a) to and from the base station 1.

In this way, when the wireless terminal 2 has no transmission data in an environment in which the level of communication with the base station 1 is lower than the threshold value, the wireless terminal 2 repeatedly transmits the BW-REQ(a) for transmitting the bandwidth request message (BW_REQ). Accordingly, the wireless terminal 2 repeatedly receives the corresponding UL-MAP (bandwidth a) from the base station 1. Namely, even during a time period when the wireless terminal 2 has no transmission data, the wireless terminal 2 can continuously receive the UL-MAP from the base station 1. Accordingly, using the continuously received UL-MAP, the wireless terminal 2 can maintain a connection with the base station 1 without transmitting a ranging signal (the bandwidth ranging signal (BW ranging) in the sequences illustrated in FIGS. 6 and 7).

Figure 8:
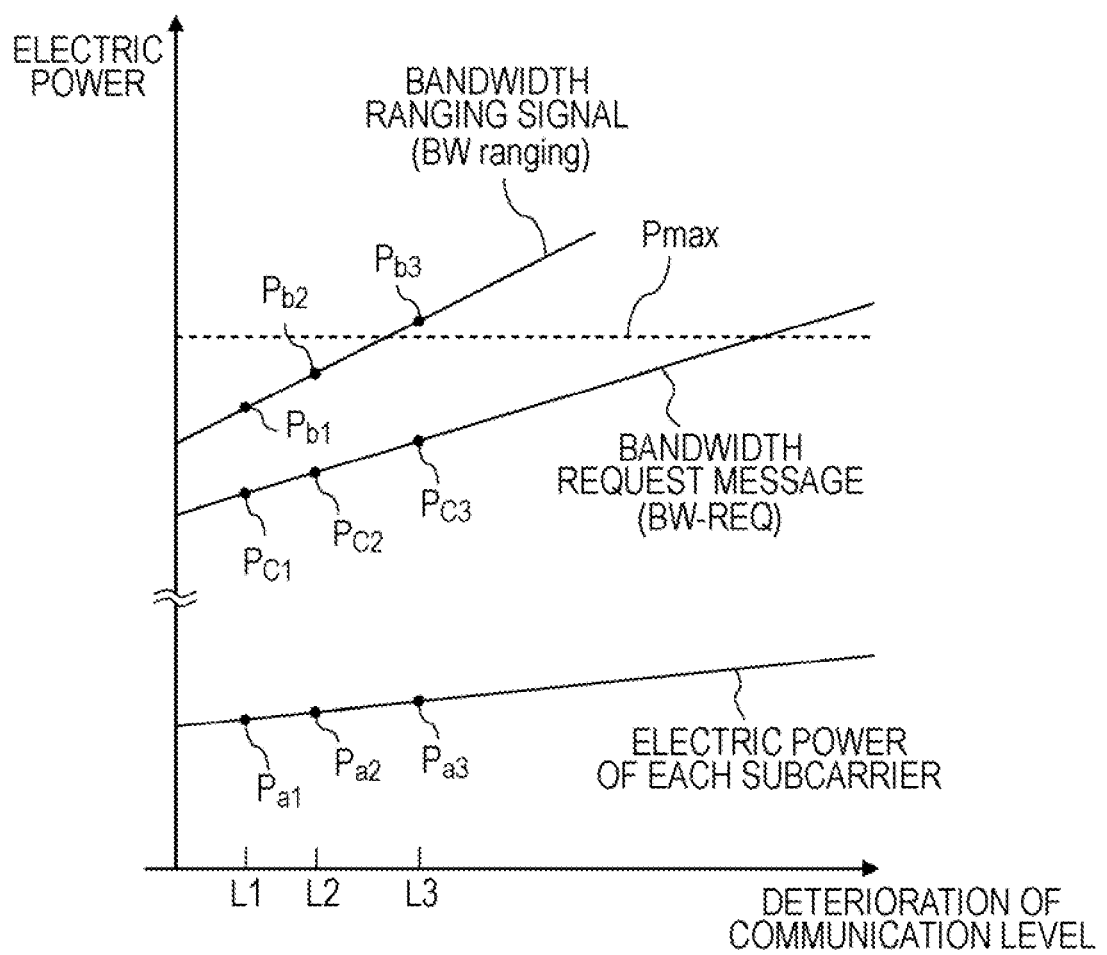
FIG. 8 is a diagram explaining necessary electric power for a subcarrier, ranging, and a bandwidth request.

Incidentally, the wireless terminal 2 includes a function for controlling transmission power in response to a communication environment. For example, when the communication level between the base station 1 and the wireless terminal 2 is lowered, the power control system of the wireless terminal 2 increases the transmission power. In an example illustrated in FIG. 8, when the communication level is deteriorated from L1 to L2, the necessary electric power of each subcarrier is increased from Pa1 to Pa2. In addition, when the communication level is deteriorated to L3, the necessary electric power of each subcarrier is increased to Pa3. Here, for example, the communication level is detected on the basis of the reception level of a signal at the base station 1, the signal being transmitted from the wireless terminal 2 with predetermined electric power. In addition, the base station 1 notifies the wireless terminal 2 of control information used for adjusting the reception level to a predetermined level. Accordingly, the electric power of each subcarrier of an OFDM signal transmitted from the wireless terminal 2 is controlled so that the base station 1 can receive the subcarrier.

Each of the bandwidth ranging signal (BW ranging) and the bandwidth request message (BW_REQ) is placed on a plurality of subcarriers and transmitted. Accordingly, when the communication level is deteriorated from L1 to L3, the necessary transmission power of the bandwidth ranging signal (BW ranging) is increased from Pb1 to Pb3, and the necessary transmission power of the bandwidth request message (BW_REQ) is increased from Pc1 to Pc3.

However, a maximum value Pmax is set for the transmission power of the wireless terminal 2 in accordance with a standard or the like. Therefore, when the necessary transmission power of the wireless terminal 2 is increased with the deterioration of the communication level, the wireless terminal 2 may not transmit a wireless signal with the necessary transmission power, in some cases. For example, in the example illustrated in FIG. 8, when the communication level is deteriorated to L3, the necessary transmission power Pb3 of the bandwidth ranging signal (BW ranging) exceeds the maximum transmission power Pmax. In this case, it is necessary for the wireless terminal 2 to keep the transmission power of the bandwidth ranging signal (BW ranging) to the maximum transmission power Pmax or less. Therefore, the electric power of each subcarrier becomes smaller than a necessary value requested by the base station 1. As a result, it is difficult for the base station 1 to receive the bandwidth ranging signal (BW ranging).

On the other hand, the message length of the bandwidth request message (BW_REQ) is short, and the bandwidth request message (BW_REQ) can be transmitted with a small bandwidth being assigned thereto. Accordingly, even if subcarriers are assigned the number of which is less than that for the bandwidth ranging signal (BW ranging), the wireless terminal 2 can transmit the bandwidth request message (BW_REQ). Therefore, the necessary transmission powers Pc1 to Pc3 of the bandwidth request message (BW_REQ) are lower than the necessary transmission powers Pb1 to Pb3 of the bandwidth ranging signal (BW ranging). Accordingly, in the example illustrated in FIG. 8, even if the communication level is deteriorated to L3, the necessary transmission power Pc3 of the bandwidth request message (BW_REQ) turns out to be lower than the maximum transmission power Pmax. Consequently, the wireless terminal 2 can set the transmission power of each subcarrier used for transmitting the bandwidth request message (BW_REQ) to a value requested by the base station 1. As a result, even if the communication level is deteriorated to L3, the base station 1 can receive the bandwidth request message (BW_REQ) transmitted from the wireless terminal 2.

In this way, in the wireless communication system according to the embodiment, for example, when the transmission power of the wireless terminal 2 is controlled so as to be a maximum value, a case may occur in which the bandwidth request message (BW_REQ) can reach the base station 1 while it is difficult for the bandwidth ranging signal (BW ranging) to reach the base station 1.

Therefore, in an environment in which the level of communication with the base station 1 is lower than the predetermined threshold value (in the embodiment, an environment in which it is difficult to transmit the bandwidth ranging signal (BW ranging) with a transmission power specified by the base station 1), the wireless terminal 2 according to the embodiment repeatedly transmits the bandwidth request message (BW_REQ) to the base station 1, regardless of whether or not the wireless terminal 2 has transmission data. Accordingly, the wireless terminal 2 can maintain a connection with the base station 1 and transmit new data without transmitting the bandwidth ranging signal (BW ranging). In addition, when having no transmission data under such an environment as described above, the wireless terminal 2 transmits the bandwidth request message (BW_REQ) for requesting a communication resource used for transmitting the bandwidth request message (BW_REQ). Accordingly, resources more than necessary are not reserved, and an influence on other wireless terminals is small.

Figure 9:
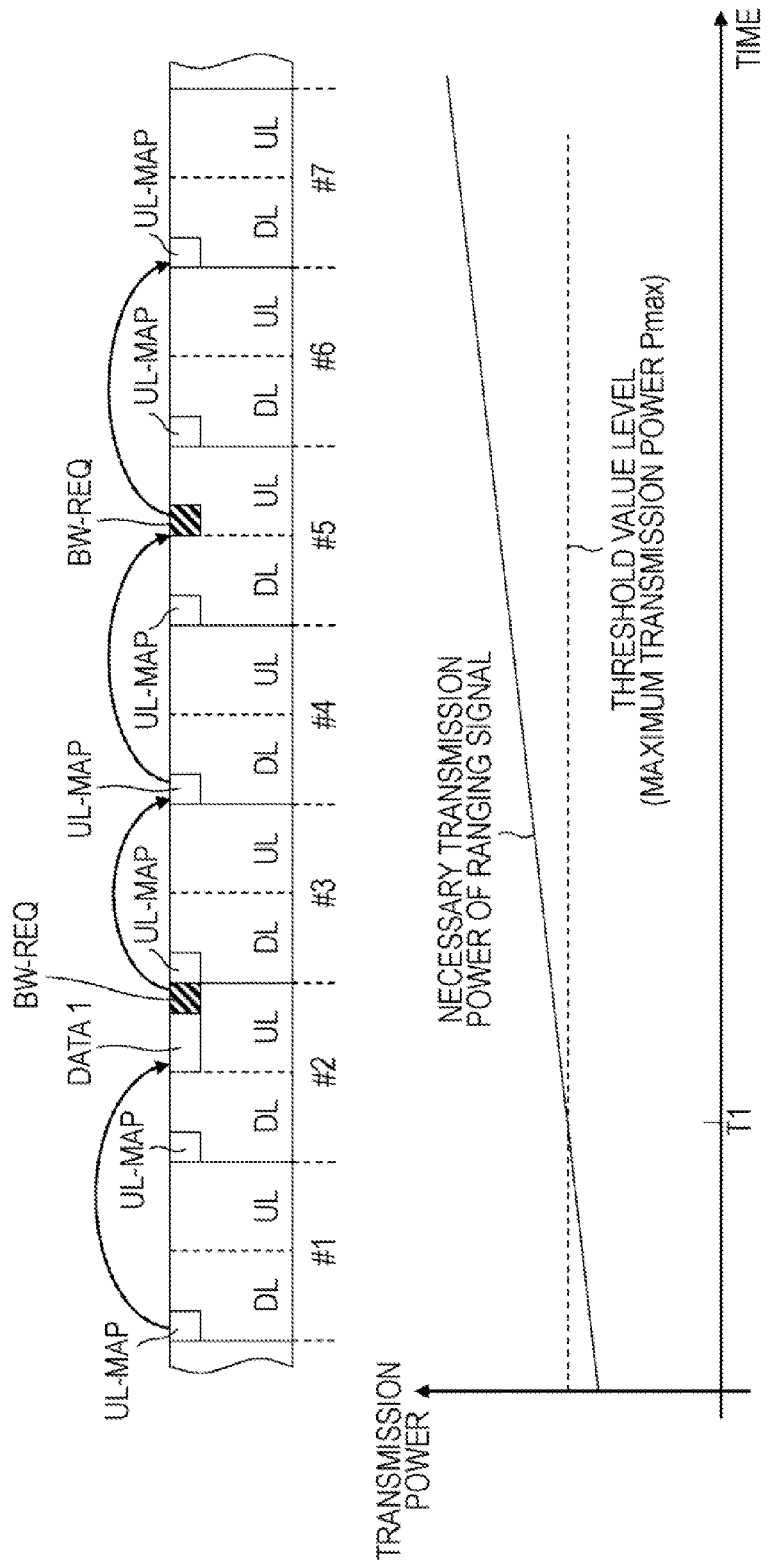
FIG. 9 is a diagram explaining an operation for maintaining a connection between the wireless terminal and the base station.

FIG. 9 is a diagram explaining an operation for maintaining a connection between the wireless terminal 2 and the base station 1. Here, frames #1 to #7 are illustrated. In each frame, DL indicates down-link data transmitted from the base station 1 to the wireless terminal 2, and UL indicates up-link data transmitted from the wireless terminal 2 to the base station 1. In addition, in the example, after a time T1, the communication level between the base station 1 and the wireless terminal 2 is lower than the threshold value.

As described above, the electric power of each subcarrier transmitted from the wireless terminal 2 is controlled in response to the communication environment. For example, the base station 1 detects a communication environment (for example, a reception level, an error rate, or the like) on the basis of a signal transmitted from the wireless terminal 2. In addition, the base station 1 notifies the wireless terminal 2 of control information for specifying the transmission power of the wireless terminal 2, so as to receive a signal transmitted from the wireless terminal 2. Accordingly, the wireless terminal 2 adjusts the electric power of each subcarrier.

When the communication level between the base station 1 and the wireless terminal 2 is lowered, a control operation for increasing the electric power of each subcarrier is performed. In this case, the transmission power of the wireless terminal 2 is increased. In addition, in the example illustrated in FIG. 9, at the time T1, a transmission power requested for transmitting the bandwidth ranging signal (BW ranging) exceeds the maximum transmission power Pmax of the wireless terminal 2. Namely, after the time T1, it is difficult for the wireless terminal 2 to transmit the bandwidth ranging signal (BW ranging) with a sufficient electric power. Therefore, after the time T1, the wireless terminal 2 maintains a connection with the base station 1, using the method described with reference to FIG. 7.

In the following description, using the UL-MAP in the frame #1, the base station 1 notifies the wireless terminal 2 of control information for transmitting the data 1. It is assumed that the UL-MAP in the frame #1 is created by the base station 1 in response to the bandwidth request message (BW_REQ) transmitted from the wireless terminal 2 to the base station 1 before the frame #1.

When receiving the UL-MAP in the frame #1, the wireless terminal 2 transmits the data 1 in the frame #2 in accordance with the UL-MAP thereof. At this time, the wireless terminal 2 has no new transmission data. However, the communication level between the base station 1 and the wireless terminal 2 is lowered than the threshold value. Accordingly, in the frame #2, in addition to the data 1, the wireless terminal 2 transmits, to the base station 1, the bandwidth request message (BW_REQ) for requesting a communication resource used for transmitting the subsequent bandwidth request message (BW_REQ).

The base station 1 transfers the data 1 received in the frame #2 to the terminal of a communication destination. In addition, when receiving the bandwidth request message (BW_REQ) in the frame #2, the base station 1 transmit, to the wireless terminal 2, the UL-MAP including control information used for transmitting the bandwidth request message (BW_REQ) in the frame #4. Consequently, the wireless terminal 2 receives the UL-MAP of the frame #4.

In accordance with the received UL-MAP, the wireless terminal 2 transmits, to the base station 1, the bandwidth request message (BW_REQ) for requesting a communication resource used for further transmitting the subsequent bandwidth request message (BW_REQ) in the frame #5. Subsequent procedures are the same.

In this way, when the level of communication with the base station 1 is lower than the threshold value, the wireless terminal 2 repeatedly transmits the bandwidth request message (BW_REQ) to the base station 1 even if the wireless terminal 2 has no transmission data. Consequently, while not using the bandwidth ranging signal (BW ranging) for which a large transmission power is necessary compared with the bandwidth request message (BW_REQ), the wireless terminal 2 can maintain a connection with the base station 1. Accordingly, when new transmission data is generated after the frame #7, the wireless terminal 2 can transmit the data to the base station 1 even under an environment in which the bandwidth ranging signal (BW ranging) does not reach the base station 1.

Figure 10:
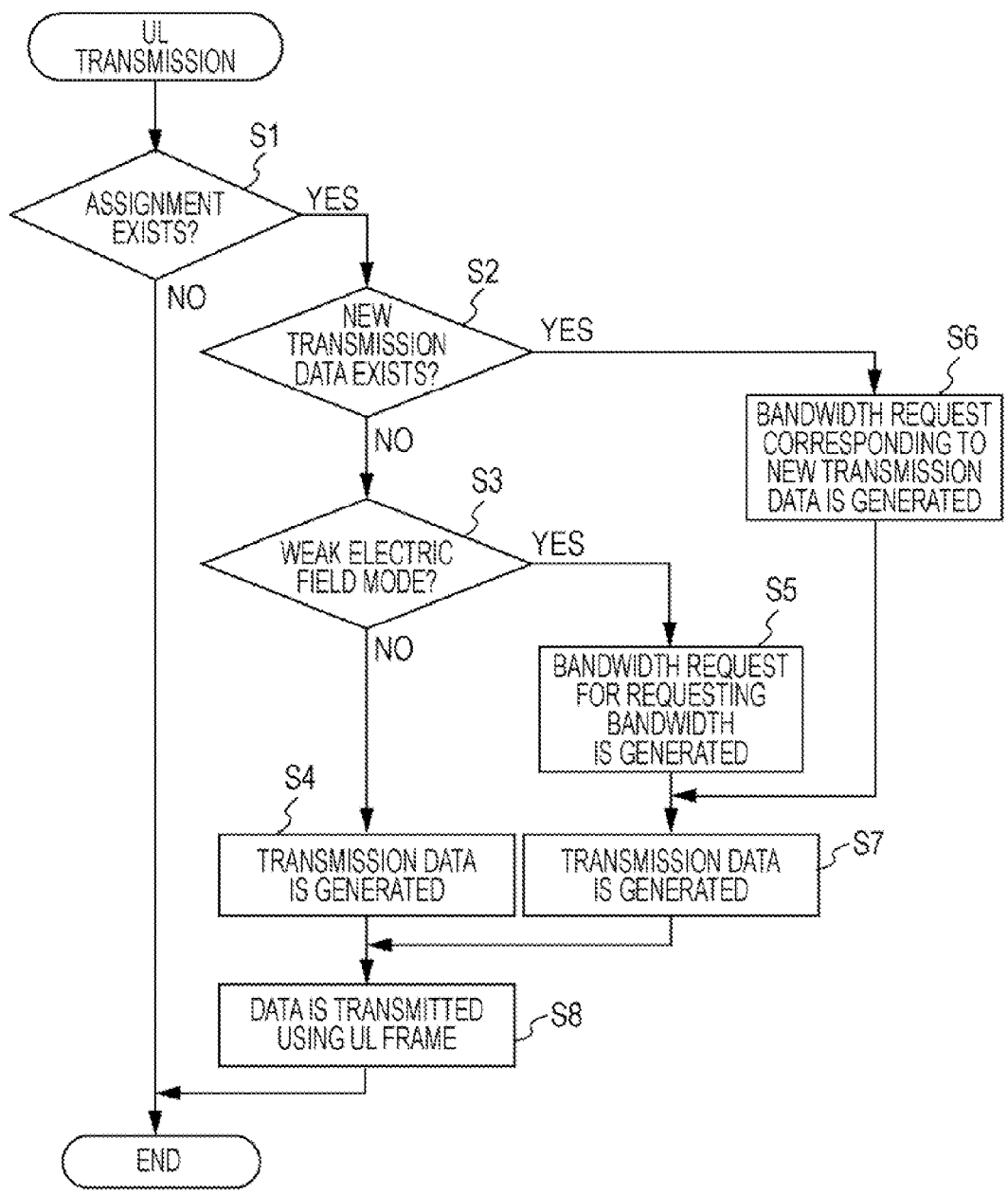
FIG. 10 is a flowchart illustrating a transmission procedure of the wireless terminal.

FIG. 10 is a flowchart illustrating the transmission procedure of the wireless terminal 2. The processing of the flowchart is executed by the MAC layer controller 52.

In Step S1, the MAC layer controller 52 determines whether or not a communication resource used for transmitting data is assigned. Here, using the UL-MAP, the base station 1 notifies the wireless terminal 2 of the communication resource used for transmitting data. In addition, when the communication resource is assigned, the processing proceeds to Step S2. On the other hand, when the communication resource is not assigned, the processing is terminated.

In Step S2, the MAC layer controller 52 determines whether or not new transmission data exists. Namely, the host unit 20 generates the new transmission data, Step S2 is determined to be "Yes", and the processing proceeds to Step S6. On the other hand, when no new transmission data exists, the processing proceeds to Step S3.

In Step S3, the MAC layer controller 52 determines whether or not a communication environment between the wireless terminal 2 and the base station 1 is a weak electric field mode. The weak electric field mode indicates that the communication level between the wireless terminal 2 and the base station 1 is lower than the threshold value. For example, when the bandwidth ranging signal (BW ranging) does not reach the base station 1, it is determined that the communication environment is the weak electric field mode. In addition, when it is determined that the communication environment is the weak electric field mode, the processing proceeds to Step S5. On the other hand, when the communication environment is not the weak electric field mode (here, it is expected that the bandwidth ranging signal (BW ranging) reaches the base station 1), the processing proceeds to Step S4.

In Step S4, the MAC layer controller 52 instructs to convert transmission data (hereinafter, referred to as "current transmission data" in some cases), generated by the host unit 20 and stored in a buffer memory, into a transmission data signal. Specifically, on the basis of the UL-MAP given notice of by the base station 1 in a precedent frame, the MAC layer controller 52 instructs to execute encoding processing, modulation processing, inverse FFT processing, D/A conversion processing, and the like for the current transmission data.

When no new transmission data exists (Step S2: No) and the communication environment is the weak electric field mode (Step S3: Yes), Step S5 is executed. In Step S5, the MAC layer controller 52 generates the bandwidth request message (BW_REQ) for requesting a communication resource used for transmitting the bandwidth request message (BW_REQ).

When new transmission data exists (Step S2: Yes), Step S6 is executed. In Step S6, the MAC layer controller 52 generates the bandwidth request message (BW_REQ) for requesting a communication resource used for the new transmission data.

In Step S7, the MAC layer controller 52 generates a transmission data signal used for transmitting the current transmission data and the bandwidth request message (BW_REQ). Here, the bandwidth request message (BW_REQ) is the bandwidth request message (BW_REQ) generated in Step S5 or S6. In this regard, however, when the UL-MAP assigns a communication resource corresponding to only the current transmission data, it may be difficult to transmit all of the current transmission data and the bandwidth request message (BW_REQ) with the communication resource in some case. Namely, if a portion of the communication resource assigned by the UL-MAP is assigned to the bandwidth request message (BW_REQ), it is difficult to assign a communication resource to a portion of the current transmission data. For example, in an example illustrated in FIG. 11, while a communication resource is assigned to a data portion a1 of the current transmission data, no communication resource is assigned to a data portion a2 of the current transmission data.

In Step S8, the MAC layer controller 52 outputs the transmission data signal through an up link. Specifically, when Step S4 is executed, the MAC layer controller 52 transmits the current transmission data. On the other hand, when Step S7 is executed, the MAC layer controller 52 transmits the current transmission data and the bandwidth request message (BW_REQ).

Figure 11:
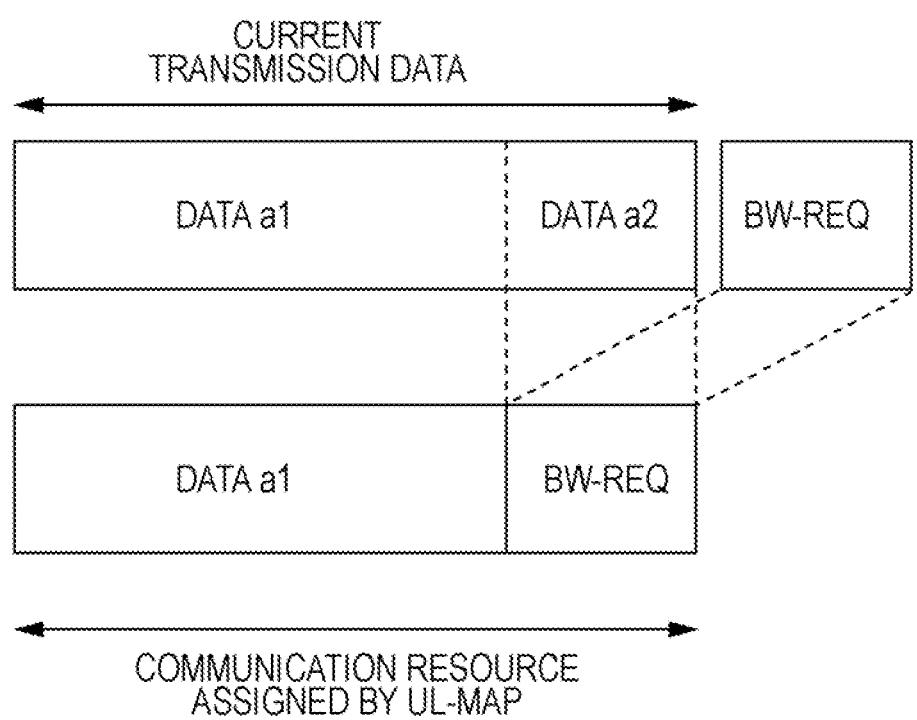
FIG. 11 is a diagram explaining an operation performed when a bandwidth request is transmitted along with data.

In addition, in the example illustrated in FIG. 11, it is necessary to transmit, to the base station 1, the data portion a2 to which no communication resource has been assigned, in a subsequent frame. Here, when a yet-to-be-transmitted data portion remains owing to the transmission of the bandwidth request message (BW_REQ), the MAC layer controller 52 may request, in Step S5, a communication resource used for transmitting "the bandwidth request message (BW_REQ)+a remaining data portion". In addition, the MAC layer controller 52 may also request, in Step S6, a communication resource used for transmitting "new transmission data+a remaining data portion".

For example, in the procedure M1 illustrated in FIG. 7, the wireless terminal 2 transmits the data 1 and the BW-REQ(a) to the base station 1. At this time, it is assumed that a portion of the data 1 is not transmitted owing to the transmission of the BW-REQ(a). Consequently, in the procedure M2, the wireless terminal 2 requests a communication resource used for transmitting "the bandwidth request message (BW_REQ)+a remaining data portion".

In the embodiment illustrated in FIG. 7, the processing of the flowchart illustrated in FIG. 10 is executed as follows. Namely, since the MAC layer controller 52 has received the UL-MAP (bandwidth 1) with respect to the data 1, Step S1 is determined to be "Yes". In addition, since no new transmission data exists after the data 1, Step S2 is determined to be "No". Furthermore, in the example illustrated in FIG. 7, since the communication level between the wireless terminal 2 and the base station 1 is lower than the threshold value at a time point when the procedure M1 is executed, Step S3 is determined to be "Yes". In addition, in the procedure M1 illustrated in FIG. 7, the wireless terminal 2 transmits the data 1 and the BW-REQ(a) to the base station 1. The BW-REQ(a) corresponds to the bandwidth request message (BW_REQ) for requesting a communication resource used for transmitting the bandwidth request message (BW_REQ), and is generated in Step S5.

Also in the procedures M2 and M5 illustrated in FIG. 7, the same processing is basically executed. In this regard, however, in each of the procedures M3 and M4, the host unit 20 generates new transmission data. Accordingly, in this case, "Yes" is determined in Step S2, and Step S6 is executed. In addition, in Step S6, the bandwidth request message (BW_REQ) for new transmission data is generated. Namely, in the procedure M3, the BW-REQ(2) for transmitting the data 2 is generated, and in the procedure M4, the BW-REQ(3) for transmitting the data 3 is generated.

Incidentally, when the level of communication with the base station 1 is lowered, the wireless terminal 2 according to the embodiment operates in a mode in which the wireless terminal 2 repeatedly transmits the bandwidth request message (BW_REQ) regardless of whether or not transmission data exists. Here, while a method for determining whether or not the communication level between the wireless terminal 2 and the base station 1 is lower than the threshold value is not limited to a specific example, the method may include the following procedures, for example.

In WiMAX (OFDMA-PHY), for example, the transmission power of each subcarrier is calculated on the basis of closed loop control or open loop control. In the closed loop control, the transmission power PNew of each subcarrier is updated in accordance with the following Expression.

$$P\text{New} = P\text{Last} + (C/N\text{New} - C/N\text{Last}) - (10 \times \log 10(R\text{New}) - 10 \times \log 10(R\text{Last})) + \text{Offset}$$

"C/N" indicates a noise level normalized on the basis of a modulation method. "R" indicates repetition.

Namely, the transmission power PNew of each subcarrier is calculated on the basis of the transmission power of each subcarrier, a noise level, and repetition at the time of previous transmission and a noise level and repetition at the time of this time's transmission. In addition, in WiMAX, the number of subcarriers used for transmitting the ranging signal is defined on the basis of the wireless bandwidth of a system. For example, in a 10 MHz bandwidth system, a wireless terminal transmits the ranging signal using 144 subcarriers. Accordingly, a transmission power necessary for transmitting the ranging signal is calculated by multiplying the transmission power of each subcarrier by the number of subcarriers.

In the open loop control, the transmission power P of each subcarrier is calculated on the basis of the following Expression.

$$P(dBm) = L + C/N + NI - 10 \times \log 10(R) + \text{Offset\_SSperSS} + \text{Offset\_BSperSS}$$

"L" indicates the loss of a path between the wireless terminal 2 and the base station 1. For example, "L" is calculated on the basis of the transmission level of a notification signal of the base station 1 and the reception level of the notification signal at the wireless terminal 2. "NI" indicates the average power of the noise and interference of each subcarrier at the base station 1. "Offset_SSperSS+Offset_BSperSS" is a fixed value and preliminarily calculated.

Namely, also in the open loop control, the transmission power of each subcarrier can be calculated in the wireless terminal 2. Accordingly, the wireless terminal 2 can calculate an electric power used for transmitting the ranging signal.

Here, for example, when a distance between the wireless terminal 2 and the base station 1 is increased, the electric power of each subcarrier of the transmission signal of the wireless terminal 2 is controlled in a direction in which the electric power of each subcarrier is increased. However, the transmission power of the wireless terminal 2 is controlled within a range smaller than the maximum value Pmax. Therefore, the transmission power Psc of each subcarrier of the transmission signal of the wireless terminal 2 is controlled so as to satisfy the following condition.

$$N \times Psc \leq Pmax$$

In addition, "N" indicates the number of subcarriers used for transmitting a signal. In addition, for example, the transmission power Psc corresponds to the PNew in the above-mentioned closed loop control.

Here, when it is assumed that the number of subcarriers used for transmitting the ranging signal is indicated by "Nr", it is estimated that it is difficult for the base station 1 to receive the ranging signal transmitted from the wireless terminal 2 when the calculated Nr×Psc exceeds the maximum power Pmax.

Accordingly, the wireless terminal 2 compares the necessary transmission power (namely, Nr×Psc) of the ranging signal, calculated as described above, with a threshold value. For example, the threshold value is the maximum transmission power Pmax of the wireless terminal 2. Alternatively, the threshold value may also be a value slightly smaller than the maximum transmission power Pmax of the wireless terminal 2. If the threshold value smaller than the maximum transmission power Pmax is used, the wireless terminal 2 can shift to the operation mode illustrated in FIG. 7 before the ranging signal turns out not to reach the base station 1.

Figure 12:
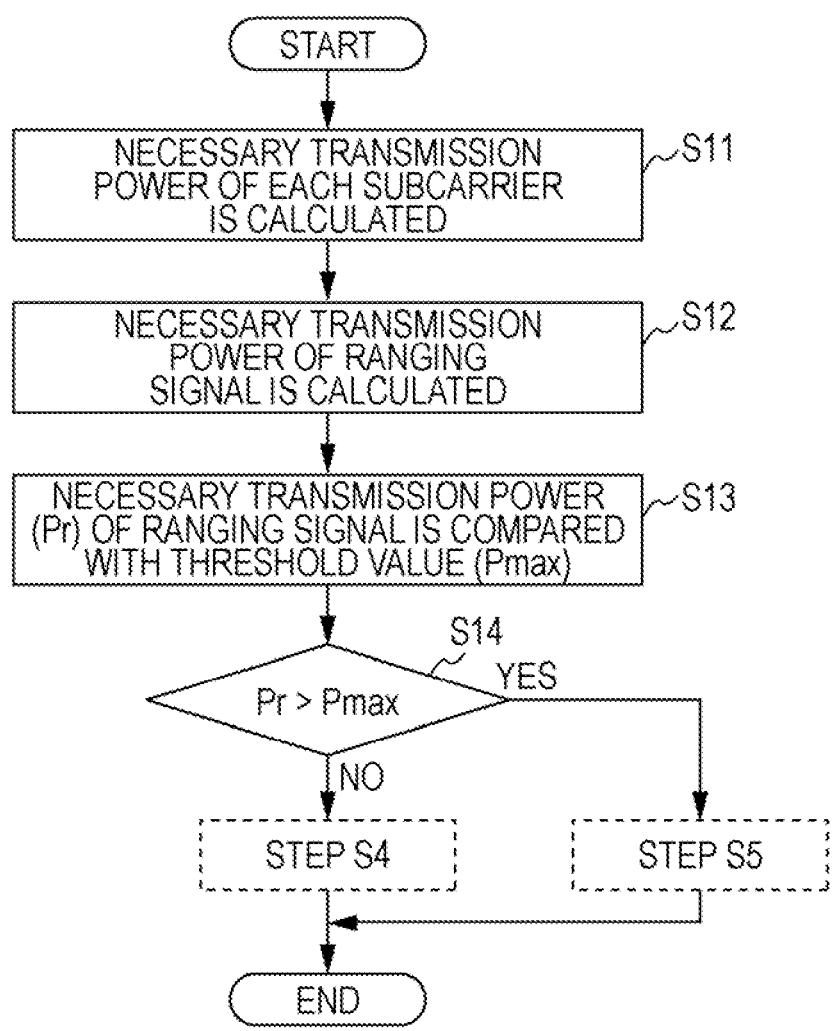
FIG. 12 is a flowchart illustrating processing for determining a communication level between the wireless terminal and the base station.

FIG. 12 is a flowchart illustrating processing for determining a communication level between the wireless terminal 2 and the base station 1. The processing of the flowchart corresponds to Step S3 illustrated in FIG. 10.

In Step S11, the MAC layer controller 52 calculates the necessary transmission power of each subcarrier. For example, the necessary transmission power of each subcarrier is calculated on the basis of the above-mentioned closed loop control or open loop control. In Step S12, the MAC layer controller 52 calculates the necessary transmission power of the ranging signal. In Steps S13 and S14, the MAC layer controller 52 compares the necessary transmission power of the ranging signal with the threshold value (the maximum transmission power Pmax of the wireless terminal 2). As a result, when the necessary transmission power of the ranging signal is greater than the threshold value, the MAC layer controller 52 determines (or, estimates) that it is difficult for the base station 1 to receive the ranging signal, and the processing shifts to Step S5. On the other hand, when the necessary transmission power of the ranging signal is less than or equal to the threshold value, the MAC layer controller 52 determines that the base station 1 can receive the ranging signal, and the processing shifts to Step S4.

The wireless terminal 2 according to the embodiment may also monitor the level of communication with the base station 1 using another method. For example, the wireless terminal 2 may also estimate the communication level on the basis of a gain calculated by the AGC unit 46 illustrated in FIG. 3. Alternatively, the wireless terminal 2 may also estimate the communication level on the basis of an error rate or the like detected in the base station 1 or the wireless terminal 2.

In addition, when the transmission power necessary for transmitting data exceeds the threshold value (for example, the maximum transmission power of the wireless terminal 2), the wireless terminal 2 may also transmit data using subcarriers whose number is less than a number given notice of by the UL-MAP. In this case, for example, the wireless terminal 2 increases the electric power of each subcarrier so that the base station 1 can receive the subcarrier. In addition, when determining the electric power of each subcarrier in such a way as described above, the wireless terminal 2 determines the number of subcarriers so that a total transmission power does not exceed the maximum transmission power.

For example, it is assumed that the number of subcarriers given notice of by the UL-MAP is 72. In addition, it is assumed that the minimum unit of the number of subcarriers used for data transmission is 24. Furthermore, it is assumed that the electric power of a subcarrier, requested so that the base station 1 can receive the subcarrier, is Psc. At this time, if 48×Psc≤Pmax≤72×Psc is satisfied, the wireless terminal 2 transmits up to data that can be placed on 48 subcarriers and sent, and does not place a signal on a transmission slot utilizing a remaining subcarrier. In addition, if 24×Psc≤Pmax<48×Psc is satisfied, the wireless terminal 2 transmits up to data that can be placed on 24 subcarriers and sent. In this case, while the base station detects a reception error with respect to a slot utilizing a subcarrier that has not been used for transmission, it is expected that the base station can correctly receive slots utilizing subcarriers used for transmission. In this regard, however, if Pmax<24×Psc is satisfied, in order to keep the total transmission power to Pmax or less, the wireless terminal 2 controls the electric power of each subcarrier so that the electric power is less than a requested value, and transmits data with placing the data on 24 subcarriers.

Next, a case will be described in which the communication level between the wireless terminal 2 and the base station 1 recovers and becomes greater than the threshold value. When the communication level recovers to a level greater than or equal to the threshold value, the base station 1 can receive the ranging signal transmitted from the wireless terminal 2. In this case, if the generation of the transmission data triggers the wireless terminal 2 to transmit the bandwidth ranging signal to the base station 1, the wireless terminal 2 can start communication. Namely, the wireless terminal 2 can transmit the generated data without maintaining communication with the base station 1. Accordingly, when the communication level recovers to a level greater than or equal to the threshold value, the wireless terminal 2 terminates an operation mode for continuously transmitting the bandwidth request message (BW_REQ) to the base station 1, in accordance with the following procedures, for example.

Namely, when the communication level recovers to a level greater than or equal to the threshold value, the wireless terminal 2 transmits, to the base station 1, the bandwidth request message (BW_REQ) indicating that a necessary communication resource is zero. When receiving the message, the base station 1 assigns no communication resource to the wireless terminal 2. Alternatively, when the communication level recovers to a level greater than or equal to the threshold value, the wireless terminal 2 transmits a predetermined data pattern with placing the data pattern on a communication slot assigned by the base station 1 in response to the previous bandwidth request message (BW_REQ). When receiving the data pattern, the base station 1 recognizes that the communication level has recovered. In addition, for example, the data pattern is null data (all bits are zero).

As described above, even under the environment in which no ranging signal reaches the base station 1, the wireless terminal 2 according to the embodiment can maintain communication with the base station 1 by repeatedly transmitting the bandwidth request to the base station 1. Accordingly, the probability that the wireless terminal 2 is determined to be "out of service" is reduced.

In addition, while, in the above description, the wireless communication system adopts WiMAX, the present invention is not limited to the example. Namely, the present invention may also be applied to another wireless communication system in which data is transmitted with being placed on a plurality of subcarriers. For example, the present invention may be applied to a wireless communication system in which an access right is requested from the base station with being placed on a predetermined number of subcarriers and a communication resource is requested from the base station using subcarriers whose number is less than the predetermined number.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A wireless terminal comprising:
an antenna configured to transmit a radio signal with a transmission power to a base station, the transmission power being determined based on quality of radio channel between the wireless terminal and the base station and determined so as not to exceed a maximum transmission power, the maximum transmission power being smaller as a number of subcarriers used by the radio signal is larger;
a memory; and
a processor configured
to control the antenna to transmit a first request signal of the radio signal using a first number of the subcarriers, the first request signal for requesting an access right to the base station;
to control the antenna to transmit a second request signal of the radio signal using a second number of the subcarriers, the second number being smaller than the first number, the second request signal for requesting a communication resource based on the access right assigned by the base station in response to the first request signal;
to control the antenna so as to transmit the second request signal when the memory stores transmission data to be transmitted using the communication resource assigned by the base station in response to the second request signal; and
to determine whether to control the antenna so as to transmit the second request signal or not based on the transmission power when the memory does not store the transmission data.

2. The wireless terminal according to claim 1, wherein the processor is configured, when the memory does not store the transmission data, to control the antenna so as to repeatedly transmit the second request signal to the base station based on the transmission power.

3. The wireless terminal according to claim 1, wherein the processor is configured to control the antenna to transmit, to the base station, a third request signal for requesting a communication resource necessary for transmitting at least a portion of the transmission data and a former request signal when the memory does not store the transmission data.

4. The wireless terminal according to claim 1, wherein the processor is configured to control the antenna to transmit a new request signal using a communication resource assigned by the base station in response to the second request signal.

5. The wireless terminal according to claim 1, wherein the processor is configured to determine whether or not the level of communication with the base station is lower than a threshold value on the basis of transmission power for transmitting the first or second request signal to the base station.

6. The wireless terminal according to claim 5, wherein the processor is configured to determine whether or not the level of communication with the base station is lower than the threshold value on the basis of transmission power for transmitting a third request signal to the base station using a communication resource assigned by the base station in response to the second request signal previously sent, and
the processor is configured to control the antenna so as to transmit the third request signal using the communication resource when the processor is configured to determine that the level of communication with the base station is lower than the threshold value.

7. The wireless terminal according to claim 6, wherein the processor is configured to control the antenna to transmit data to the base station with the communication resource for transmitting the data on subcarriers whose number is determined on the basis of the transmission power calculated by the processor.

8. The wireless terminal according to claim 1, wherein the processor is configured to control the antenna to transmit, to the base station, a request signal indicating that a necessary communication resource is zero when a level of communication with the base station recovers to a level not less than a threshold value.

9. The wireless terminal according to claim 1, wherein the processor is configured to control the antenna to transmit a predetermined data pattern using a communication resource assigned by the base station in response to the second request signal when a level of communication with the base station recovers to a level not less than a threshold value.

10. A wireless interface included in a wireless terminal, the wireless interface comprising:
a first transmitter configured to control an antenna of the wireless terminal to transmit a first request signal using a first number of subcarriers, the first request signal for requesting an access right to a base station; and
a second transmitter configured to control the antenna to transmit a second request signal using a second number of the subcarriers, the second number of subcarriers being smaller than the first number, the second request signal for requesting a communication resource based on the access right assigned by the base station in response to the first request signal, wherein
the second transmitter controls the antenna to transmit the second request signal and determines whether to control the antenna so as to transmit the second request signal or not when a memory of the wireless terminal does not store transmission data.

11. A non-transitory computer-readable media storing a data transmission program for causing a processor, included in a wireless terminal to control an antenna of the wireless terminal that transmits a radio signal with a transmission power to a base station, the transmission power being determined based on quality of radio channel between the wireless terminal and the base station and determined so as not to exceed a maximum transmission power, the maximum transmission power being smaller as a number of subcarriers used by the radio signal is larger, the data transmission program causing the processor to perform:

controlling the antenna to transmit a first request signal of the radio signal using a first number of the subcarriers, the first request signal for requesting an access right to the base station;

controlling the antenna to transmit a second request signal of the radio signal using a second number of the subcarriers, the second number being smaller than the first number, the second request signal for requesting a communication resource based on the access right assigned by the base station in response to the first request signal; and determining whether to control the antenna so as to transmit the second request signal or not when a memory of the wireless terminal does not store transmission data.

12. A wireless communication method for a wireless terminal including a memory, processor, and an antenna that transmits a radio signal with a transmission power to a base station, the transmission power being determined based on quality of radio channel between the wireless terminal and the base station and determined so as not to exceed a maximum transmission power, the maximum transmission power being smaller as a number of subcarriers used by the radio signal is larger, the wireless communication method comprising:

controlling the antenna to transmit a first request signal of the radio signal using a first number of the subcarriers, the first request signal for requesting an access right to the base station;

controlling the antenna to transmit a second request signal of the radio signal using a second number of the subcarriers, the second number being smaller than the first number, the second request signal for requesting a communication resource based on the access right assigned by the base station in response to the first request signal; and determining whether to control the antenna so as to transmit the second request signal or not when a memory of the wireless terminal does not store transmission data.

13. The wireless terminal according to claim 5, wherein the threshold value is set at a border of whether the base station is able to receive the request signal or not.

14. The wireless terminal according to claim 1, wherein the processor is configured, when the memory does not store the transmission data, to determine to control the antenna so as to transmit the second request signal further when the processor detects a state indicating that the transmission power for the first request signal is not enough to be received by the base station.

15. The wireless terminal according to claim 14, the processor detects the certain state based on the second request signal.

16. The wireless terminal according to claim 14, the processor detects the state based on the transmission power for the second request signal.

17. The wireless terminal according to claim 14, the state is that a difference between the maximum transmission power for the second request signal and the transmission power for the second request signal is smaller than a threshold.

18. The wireless terminal according to claim 14, the state is that the transmission power for the second request signal is larger than a threshold.

* * * * *